US005180437A

United States Patent [19]
Anderson et al.

[11] Patent Number: 5,180,437
[45] Date of Patent: Jan. 19, 1993

[54] MACHINE FOR WASHING PLASTIC FRAGMENTS TO PREPARE THEM FOR RECYCLING

[76] Inventors: Robert M. Anderson, P.O. Box 174, Rover, Ark. 72860; John E. Vining, Sr., P.O. Box 158, Sondheimer, La. 71276; Lloyd L. Patton, Sr., 100 Willow Glen Dr., Vicksburg, Miss. 39180

[21] Appl. No.: 791,346

[22] Filed: Nov. 14, 1991

Related U.S. Application Data

[62] Division of Ser. No. 633,795, Dec. 26, 1990, abandoned.

[51] Int. Cl.⁵ .................. B08B 3/00; B08B 3/04; B08B 3/14
[52] U.S. Cl. .................. 134/10; 134/25.1; 134/33; 134/61; 134/63; 134/65; 134/79; 134/104.3; 134/104.4; 134/153; 134/108; 134/119; 134/182
[58] Field of Search ............. 134/25.1, 33, 61, 63, 134/65, 79, 104.3, 104.4, 108, 111, 119, 120, 133, 140, 153, 155, 182, 10

[56] References Cited
U.S. PATENT DOCUMENTS

| | | | |
|---|---|---|---|
| 1,132,597 | 3/1915 | Marlin | 134/153 |
| 2,503,556 | 4/1950 | McCargar | 134/153 |
| 2,684,560 | 7/1954 | Swanson | 134/153 |
| 3,400,871 | 9/1968 | Davis | 266/12 |
| 4,106,518 | 8/1978 | Buzga et al. | 134/104.4 |
| 4,173,493 | 11/1979 | Kallas | 134/11 |
| 4,436,104 | 3/1984 | Kashiwagi | 134/104.4 |
| 4,453,556 | 6/1984 | Corbett | 134/65 |

Primary Examiner—Theodore Morris
Assistant Examiner—Zeinab El-Arini
Attorney, Agent, or Firm—Hill, Van Santen, Steadman & Simpson

[57] ABSTRACT

A process of, and apparatus for, washing fragments, such as plastic fragments, in a continuous fashion as part of a recycling operation. The plastic fragments are fed into an axially rotating perforated tube, wherein a stationary washing and rinsing spray header are mounted therethrough for spraying the plastic fragments revolving with the tube. Wash and rinse water pass through the perforations, carrying with the water residue and unwanted particles. The wash water, rinse water and unwanted particles pass into a trough arranged below the revolving tube which collects the water and residue and transports same to either a screen separator in the case of the wash water, or a holding tank in the case of the rinse water. Auxiliary systems are disclosed for using recycled wash water and recycled rinse water for the process. A drying system which receives the plastic fragments from the washing apparatus is also disclosed.

12 Claims, 4 Drawing Sheets

FIG. 4
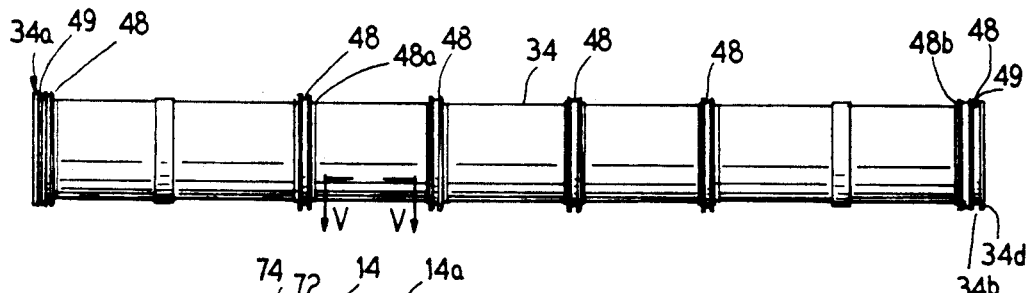
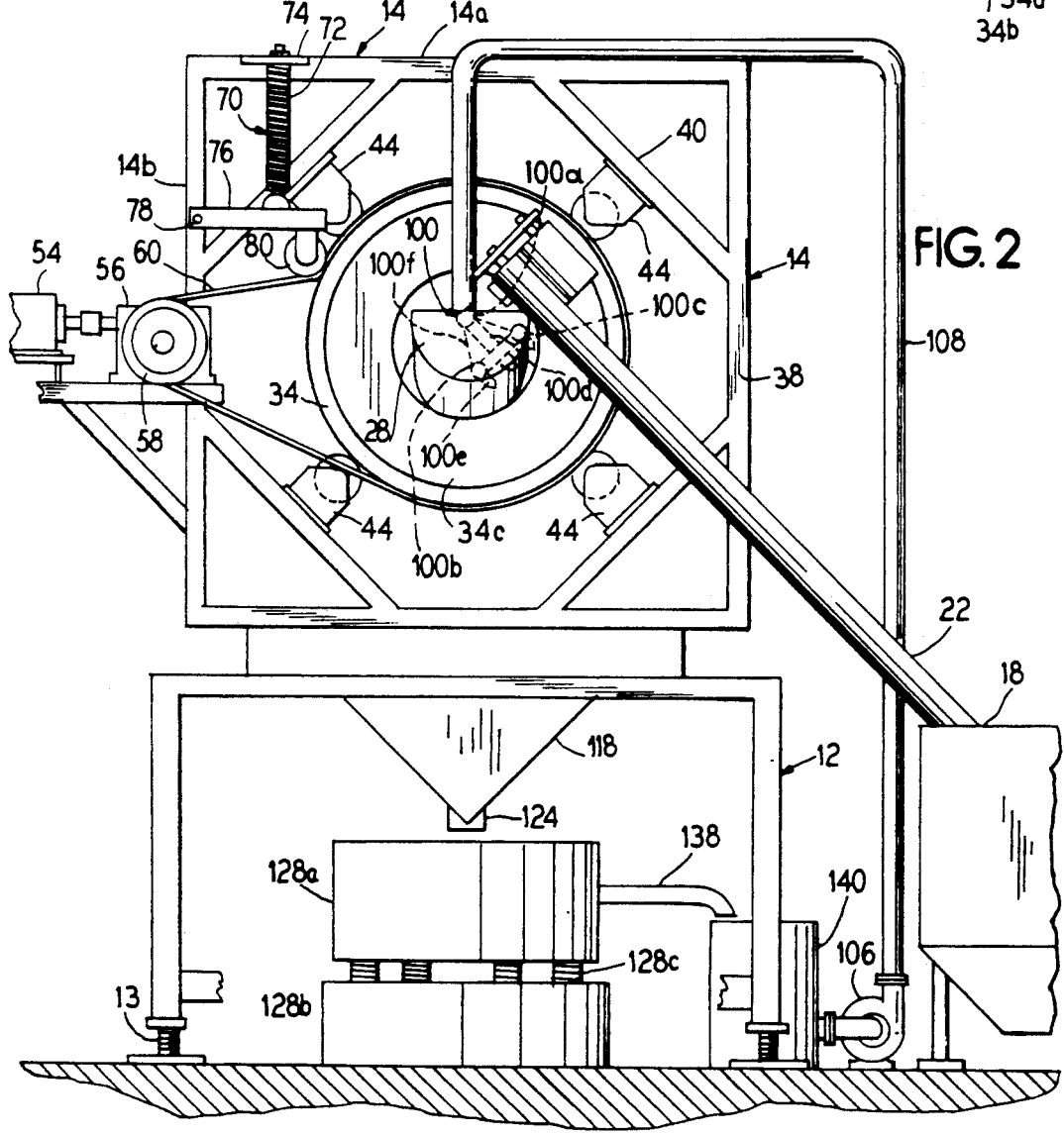
FIG. 2

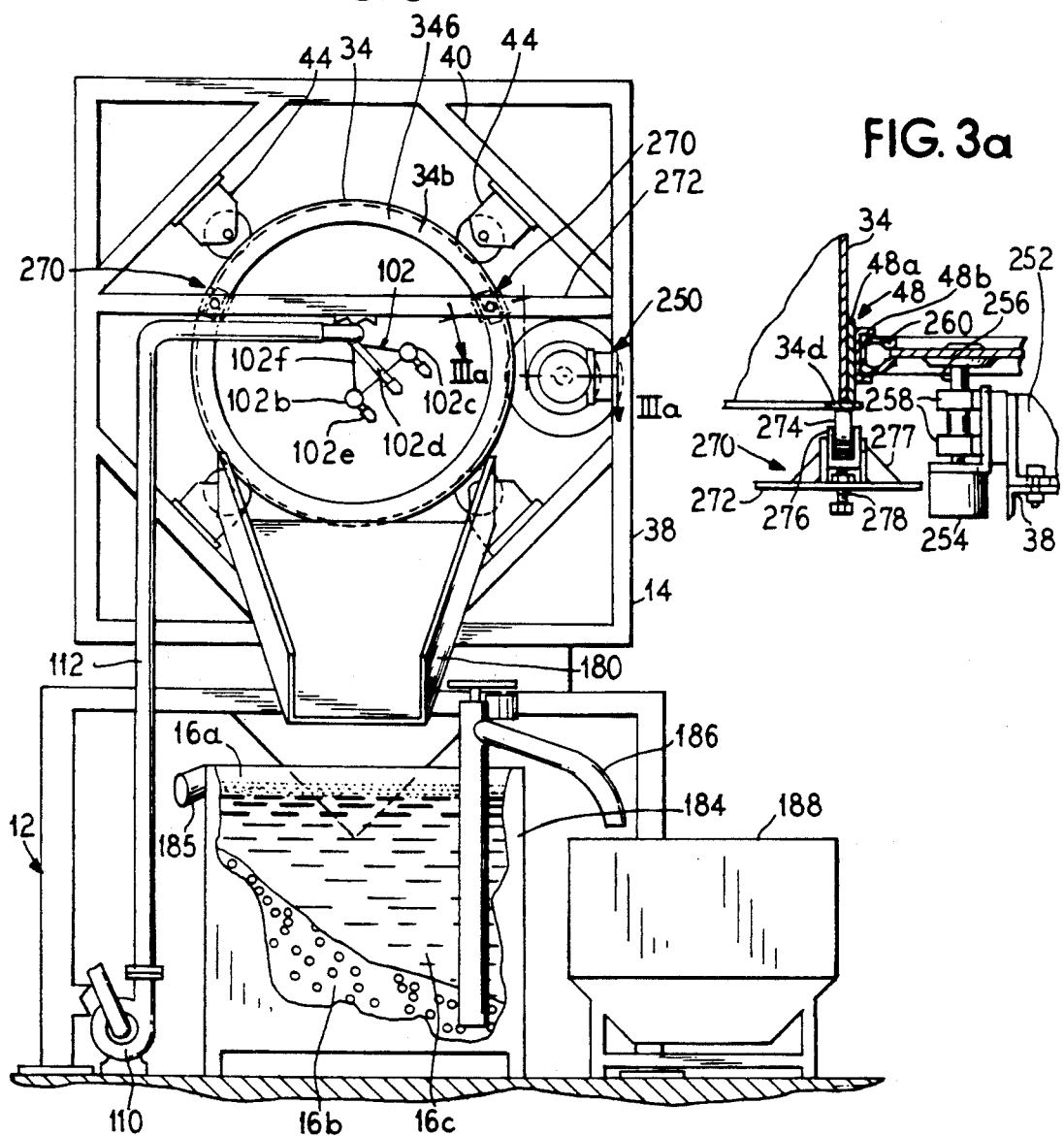
FIG. 3
FIG. 3a
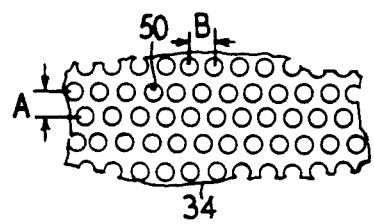
FIG. 5

MACHINE FOR WASHING PLASTIC FRAGMENTS TO PREPARE THEM FOR RECYCLING

This is a division of U.S. patent application Ser. No. 633,795, filed Dec. 26, 1990, now abandoned.

BACKGROUND OF THE INVENTION

The invention relates to a process of and a machine for washing fragments, such as plastic fragments, to prepare them for recycling. The machine and process can be applied to washing other types of fragments as well. Various kinds of plastic products are ground up or chopped into small particles by a machine called a "plastic granulator" generally available in the marketplace. The sizes of plastic particles or fragments can vary, but for the preferred embodiment, the typical particle size is three eighths to one half inch (95 to 127 mm). Plastic bags can also be fragmented or processed by this type of machine.

In recycling operations heretofore provided the plastic particles have been washed to remove paper, adhesives, and undesirable particles in a batch washing apparatus.

SUMMARY OF THE INVENTION

The present invention relates to a process and apparatus therefor operable to wash a continuous stream of plastic particles or fragments.

In practicing the novel steps of the invention, particles to be washed are loaded into an axially revolving tube by means such as by an auger or screw lifting device which transports the particles from a bin. The feeding mechanism could also be a gravity feed, a conveyor belt, or some other means. A light blast of water, which may be heated, helps move the material from an inflow tube or trough into the rotating tube. Direct insertion of the plastic particles into the rotating tube, rather than through a feed trough is also possible. The rotating tube rotates about its axis similar to a kiln. The rotating tube is perforated over its surface to accommodate the removal of water and small particles from inside the tube. The rotating tube is sloped, at a selected angle depending on the application, from inlet end to outlet end, which aids lineal progression of the particles along the length of the rotating tube.

The rotating tube is driven by one drive roller or a pair of drive rollers, one at each end of the tube. These rollers can be friction drive pneumatic wheels or tires, powered by hydraulic motors. Alternatively, the rotating tube can be driven by at least one motor driven belt circumferentially wrapped around the tube. If the rotating tube is of a significant length, a second drive belt driven by a second electric motor is utilized at an opposite end or in spaced relation to the first belt on the rotating tube.

Located inside the rotating tube is an axially arranged washing "header" or "boom" having a wash water inlet at one end, and spraying nozzles along a selected portion of its length, which spans an inlet region of the tube. The washing liquid may comprise water mixed with detergent.

Also located inside the tube is an axially arranged rinsing header or boom having a rinse water inlet at one end, and spraying nozzles along a selected portion of its length. This selected portion of the rinsing boom, spanning an outlet region of the tube sprays water only, for rinsing.

The washing header and the rinsing header can be a single header spanning the tube with the wash water inlet and the rinse water inlet at opposite ends, with a flow barrier located at a center portion to prevent mixing of the wash water and rinse water in the header.

Auxiliary equipment for a complete system includes water heaters for both the wash water and the rinse water, a wash water tank in which detergent can be mixed with water, and pumps to provide pressurized water for washing and rinsing. Also, below the rotating tube is located a V-shaped trough which, in the inlet region, collects water paper, adhesives, and residue, etc. from the washed particles washed above. Water and these materials are carried to a vibrating screen separator which removes these particles and material and recycles the water to a wash water system. The wash water system can comprise the water heater, tank and at least one pump. The V-shaped trough extends under the outlet region also where rinse water is collected and recycled to a rinse water system similar to the wash water system. The wash and rinse waters are recycled separately.

The washed particles or fragments work their way through the length of the tube by gravity flow and fall out of the tube and into a bin at the outlet of the rotating tube. A separation of different types of particles can take place in this bin if some of the particles float and some sink. For example, some soft drink containers are made of polyethylene terathalate while the bottom portion of soft drink bottles are made of high density polyethylene. Particles of the bottles will sink and particles of the bottoms will float, enabling the bin to be used as a float tank to separate the types of particles. Ordinarily the plastics run through the tube are presorted.

There are at least four major types of plastic materials that can be processed as described:

1. High density polyethylene such as bottom portions of plastic soft drink bottles;
2. Low density polyethylene such as plastic bags;
3. Polyvinyl chloride such as detergent and chemical bottles; and
4. Polyethylene terathalate such as soft drink bottles.

By selectively adjusting variables such as: angle of the rotating tube, temperature of water, speed of rotation, pressure of wash and rinse water, and the size of perforated holes in the rotating tube, the process can be adapted to process specific types of materials.

After the plastic particles have emerged from the washing process they can then be dried in a spin dryer. This will remove the majority of the water remaining. The plastic particles can then be run through another rotary drier through which ambient air, heated by an outside source of heat, can be forced by means of ducts and fans. The outside source of heat can be supplemented by heat provided by the hot exhaust gas from the water heaters. After drying, the dry plastic particles are placed in an extruder that will melt them and extrude them into pellets for shipment to and reuse by manufacturers.

The present invention provides an effective apparatus and process for washing fragments such as plastic fragments in preparation for recycling. Recycling rinse water and wash water reduces and minimizes discharges to a public or factory sewer, is cost effective, and beneficial to the environment.

BRIEF DESCRIPTION OF THE DRAWINGS

FIG. 2 is an inlet side view of the apparatus of FIG. 1;

FIG. 3 is an outlet side view of the apparatus of FIG. 1;

FIG. 3a is a partial sectional view taken generally along IIIa—IIIa of FIG. 3.

FIG. 4 is an isolated elevational view of a rolling tube of the apparatus of FIG. 1;

FIG. 5 is a sectional view generally along line V—V of FIG. 4;

DETAILED DESCRIPTION OF THE PREFERRED EMBODIMENTS

Figure 1:
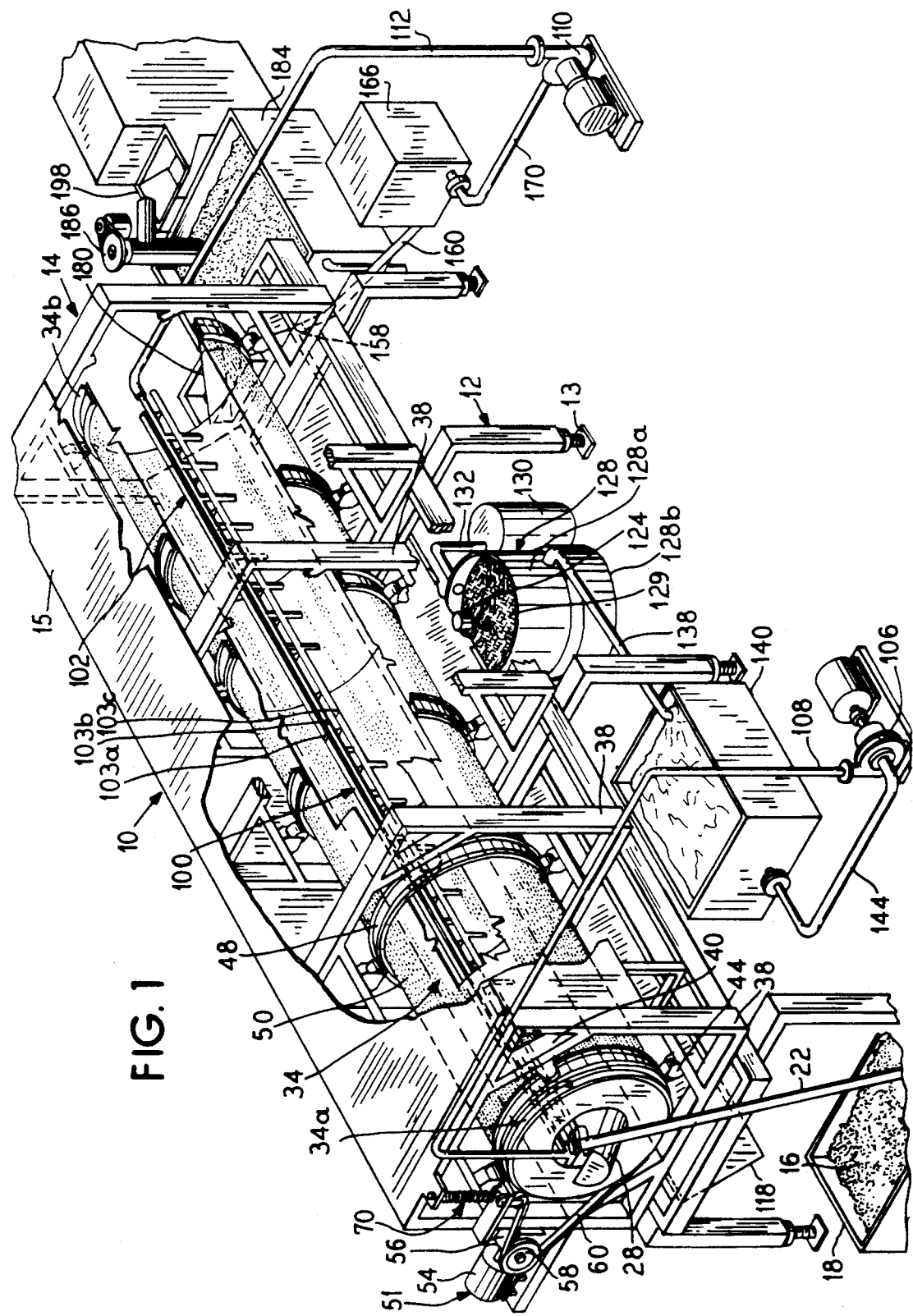
FIG. 1 is a perspective view of an apparatus for washing plastic fragments with a portion of an outer paneling removed for clarity.

FIG. 1 shows a washing apparatus generally at 10 supported on an elevated frame 12, comprising a superstructure 14 covered by panelling 15 The frame 12 has a plurality of level adjusting feet 13 which can be used to slope the entire apparatus 10 along its length. The apparatus 10 is fed fragments 16 from a fragment bin 18 via an auger or an auger-type material moving device 22. The auger 22 lifts plastic fragments 16 up to an inlet trough 28 for entry into the apparatus 10.

The inlet trough 28 feeds fragments 16 into a rotatable tube 34 which is rotatably supported along its axis by the superstructure 14. The superstructure 14 comprises along its length a plurality of longitudinally spaced apart bents 38 which each provide knee braces 40 which, in turn, have mounted thereon rollers 44. Each bent 38 mounts four such rollers 44. The rolling tube 34 comprises a saddle 48 located at each bent 38. The saddle 48 reinforces the rolling tube and provides a smooth surface for interaction with the rollers 44. The saddle 48 is captured between four rollers 44 arranged in a quadrilateral pattern. The rolling tube 34 provides many perforations 50 therethrough sized and disposed to facilitate the passage of liquid and correspondingly sized particles.

The tube 34 is axially rotated by a first drive means 51 which can be a drive roller arrangement such as described in FIG. 3 with respect to the second drive means 250. Alternatively, as a first drive means 51 and as shown in FIG. 1, the rolling tube 34 is rotated about its axis by a motor 54 communicating to a right angle gear box 56, the gear box 56 turning a pulley 58. The pulley 58 drives a belt 60 which is circumferentially wrapped around the rolling tube 34. A tension adjuster 70 is utilized to take up slack in the belt and to provide a smooth, non-slipping, and efficient communication of rotational power from the pulley 58 to the rolling tube 34. The tension adjuster 70 as more clearly shown in FIG. 2, comprises a spring 72 mounted by a bracket 74 to a top 14a of the superstructure 14. The spring 72 acts upon a lever 76 pivotally mounted via a pin 78 to a side 14b of the superstructure 14. The lever 76 has thereon mounted a counter-pulley or idler roller 80 which can move toward and press against the belt 60. The spring 72 provides a resilient downward force upon the lever 76 which transmits this force via the idler roller 80 to the belt 60, thus causing the belt 60 to remain tightly wrapped around the rolling tube 34.

Mounted axially extending throughout the rolling tube 34 are a wash header 100 and a rinse header 102. The wash header 100 and the rinse header 102 are constructed as a continuous span but having appropriate blockage or blinds 103 to prevent mixing of wash water and rinse water in the headers 100,102. The headers are more fully described with respect to FIGS. 2 and 3. The wash header 100 is fed via a wash pipe 108 from an outlet of a wash pump 106. The rinse header 102 is fed via a rinse pump 110 through a rinse pipe 112.

Below the elevated superstructure 14 and below the rolling tube 34 is arranged an effluent trough 118. The effluent trough 118 receives in a first section 118a, wash water with residue which passes through the perforations 50 from the rolling tube 34. The effluent trough 118 also receives in a second section 118b, rinse water with remaining residue from the rolling tube 34. The first section 118a can be separated from the second section 118b by a partition 118c. The wash water with residue flows along the trough to an outlet drain 124 and into a screen separator 128. Residue and particles which do not pass through a screen 129 of the separator 128 are collected in a container 130 via a feed tube 132. Wash water which passes through the screen 129 passes into a tank 128a and is removed by gravity flow to a wash water tank 140 via a discharge line 138. The separator 128 can be a commercially available vibrating screen type separator. The separator 128 is shown mounted on springs 128c to the base 128b, which houses a drive mechanism for the separator 128. The wash pump 106 takes suction from the recycle tank 140 via a wash inlet line 144.

Toward an outlet end of the apparatus 10, the effluent trough 118 collects rinse water with any remaining residue from the perforations 50 of the rolling tube 34 and passes such through a second outlet drain 158 through a rinse effluent line 160 to a rinse water tank 166. The rinse pump 110 takes suction from the rinse water tank 166 via a suction line 170.

The fragments 16 which enter the inlet trough 28 can be given a blast of hot or cold water at the inlet trough 28 from the wash pipe 108 or wash header 100 to help progress the fragments 16 into the rolling tube 34. Once inside the rolling tube 34 the fragments 16 proceed along the length of the rolling tube 34 as the rolling tube 34 rotates or revolves axially. The fragments 16 are washed both by spray from the wash header 100 and by an abrading action caused by the rolling of fragments over each other as the rolling tube rotates axially. The rolling tube 34, in the preferred embodiment, is sloped from its inlet side 34a toward its outlet side 34b to assist continuous axial progression of the fragments 16 along the tube 34.

At the outlet side 34b a fragment trough 180 directs the fragments 16 downwardly into an outlet bin 184. A second auger 186 transports the fragments 16 to a succeeding process step, in FIG. 1 the second auger 186 transports the fragments 16 into a holding bin 188. The outlet bin 184 can be used as a float separator. As show in FIG. 3, fragments which float 16a can be separated from fragments which sink 16b.

FIG. 2 shows that the rolling tube 34 comprises at its inlet end 34a and annular plate 34c which prevents spillage of fragments 16 or water from out of the rolling tube 34.

The wash header 100 comprises three subheaders 100a, 100b, 100c. The three subheaders are interconnected by a tee pipe 100d. Each of the subheaders 100a, 100b, 100c has progressing downwardly therefrom a plurality of spray nozzles 100e. The three subheaders 100a, 100b, 100c are structurally tied together by use of a plurality of rectangular or triangular gusset plates 100f which give the header pipes rigidity and truss-like bending resistance to span greater distances.

FIG. 3 shows the fragment trough 180, stationary with respect to the superstructure 14, in position to spill fragments 16 emerging from the outlet end 34b of the rolling tube 34. The rinse water header 100 is shown connected to the rinse water pipe 112. The rinse water header 102 can comprise an identical header configuration as the wash water header 100. However, in the preferred embodiment the wash spray nozzles 100e of the wash water header 100 are arranged to span 57% of the tube length while the rinse spray nozzles 102e of the rinse water header 102 are arranged to span the last 36% of the tube length. The rinse water header 102 comprises three header pipes 102a, 102b, 102c, connected by a tee pipe 102d and tied structurally together by rectangular or triangular gussets 102f. Rinse nozzles 102e proceed downwardly from the header pipes 102a, 102b, 102c.

Alternatively, as a simpler arrangement, the rinse water header 102 can comprise only the subheader 102a with a single row of rinse nozzles 102e. No tee pipes 102d would be required, simply vertical droplet pipes down to the nozzles 102e.

The bin 184 can be used to separate the fragments that float 16a from the fragments that sink 16b. A skimming outlet 185 is provided at a high level in the bin 184 to remove floating fragments 16a. The second auger removes the fragments that sink 16b.

If the tube 34 is sufficiently long, a second drive means 250 is used near the second end 34b of the tube 34. As shown in FIG. 3a, the second drive means illustrated is a drive roller configuration. In this embodiment, a hydraulic motor 254 is mounted to the bent 38 using a bracket arrangement 252. The motor 254 communicates through a shaft 256, which is itself journaled in bearing journals 258, to a drive roller 260 which frictionally abuts the saddle 48 and is guided between side walls 48b of the saddle 48. The saddle 48 thus provides a guideway for rolling engagement of the tire around the circumference of the tube 34. This saddle 48 also can hold within its side walls 48b the four rollers 44. Thus, when the hydraulic motor 254 turns the drive roller 260, the frictional engagement causes a rolling of the tube 34. It should be noted that the embodiment of the second drive means 250 can be readily utilized at either the first end 34a or the second end 34b of the tube 34, or at both ends 34a, 34b of the tube 34. Alternatively, the first drive means, of the belt arrangement, can be utilized at either the first end 34a or the second end 34b of the tube 34, or at both ends of the tube 34. Other combinations involving these two drive means are also readily recognizable, and are encompassed by the present invention.

Also shown in FIG. 3 and more clearly in FIG. 3a, is a thrust bearing arrangement 270. Two thrust bearings 274 are utilized. The thrust bearings 274 are mounted for rotation into a U-shaped journal 276. The U-shaped journal 276 is supported and guided by opposing brackets 277 which are anchored to a cross member 272. The journal 276 can be displaced toward or away from the cross member 272 by use of a set screw 278. The thrust bearing 274 abuts the second annular plate 34d at the second end 34b of the tube 34. As the tube 34 is axially rotated, the thrust bearing 274 rotates within the journal 276. The thrust bearing 274 has a wheel-like shape and rolls in-place around the annular plate 34d as the annular plate revolves. The thrust bearing arrangement 270 opposes axial displacement of the tube 34 toward the cross member 272 which is itself anchored to the last bent 38 on the downward sloping end of the tube 34.

FIG. 4 shows the rolling tube 34 isolated from the apparatus 10. Shown are a plurality of saddles 48 along the length of the rolling tube 34. Near opposite ends 34a, 34b of the rolling tube 34 are journals or grooves 49 wherein can be held the belt 60. The journals are formed by attaching annular plates to an outside of the tube 34. The annular plate 34c can be increased in diameter to serve this function at the first end 34a of the tube 34. At the second end a second annular plate 34d is welded to an outside of the tube 34. In one embodiment, the annular plate 34c is spaced axially apart from a saddle 48 to form a journal 49 therebetween for the belt 60. The second annular plate can be spaced axially apart from a second thrust saddle 48 to form a journal 49 therebetween for a second belt.

Also shown in FIG. 4 is the saddle 48. The saddle 48 provides the annular side walls 48b which guide the associated roller 44 therebetween as the tube 34 is axially revolved. The saddle 48 thus guides the four rollers 44 at each bent. The saddle 48 is formed by rolling a channel into a circle with an open side of the channel facing outwardly of the circle. The saddle 48 is attached around an outside diameter of a band 48a or possibly attached directly to the tube 34 without a band 48a.

As described above, where a drive roller assembly 250 is utilized at either end, the drive roller 260 is most appropriately located in the saddle 48, between the side walls 48b. However, the drive roller 260 could also conceivably be located to roll inside the journal 49 as described above.

In the preferred embodiment the tube 34 is a 34 inch diameter 11 gauge stainless steel tube, 28 feet long. The saddles 48 are 6 inches wide and in addition to providing a rolling surface for the rollers 44 and reinforcing the tube 34, the saddles 48 can be used at seams of the tube 44 to join sections of the tube 34 in axial arrangement. The saddle 48 is formed by welding a circularly rolled 2 inch by 1 inch structural channel and welding the channel to a band 48a, or to the tube 34 if a band is not used. The journal 49 is approximately 5 inches wide to hold a 4½ inch belt 60, 260. The saddles 48 are arranged along the axis of the tube 34 at every 4 feet. The rollers 44 are 4 or 5 inches by 1¾ inch rollers.

It has been determined that for a 28 foot long tube 34 the first 16 feet of axial length are preferably used for washing, the next 2 feet of axial length has neither washing nor rinsing nozzles, and serves as a dead space or separation of washing and rinsing, and the remaining 10 feet are used for rinsing the fragments 16.

The wash header and rinse header may be constructed from pipe with a diameter sufficient to carry water supply to ¼ inch pipe droplets, 6 inches apart. The spray nozzles should be large enough to deliver 70 gallons per minute at 30 p.s.i. pressure.

The ideal water temperature for most applications is in the 155°–180° F. range. However, unheated water can be used in certain applications, such as when no labels are involved. Higher temperatures actually are counter productive for containers with residue of high temperature motor oils. Part of the cleansing is produced by the water spray and part by the abrasive action of the particles over each other as the tube rotates.

The inventors have washed 2,000 lbs/hr. of plastic fragments with the described embodiment with an average rate in the 1200-1400 lbs/hr. range. The rate depends on many factors including the type of fragments, adhesive and other contaminants.

FIG. 5 shows a pattern of the perforation holes 50 formed in the rolling tube 34. In one exemplary a pattern of embodiment, the holes are ⅛ inch (32 mm) in diameter and are spaced at A=3/16 inch. (48 mm) and B=3/16 inch (48 mm), essentially so that the holes 50 comprise 40% of the surface area of the rolling tube 34. These dimensions corresponds to the typical dimension of plastic fragments being ⅜ inch (95 mm) to ½ inch (127 mm).

Figure 6:
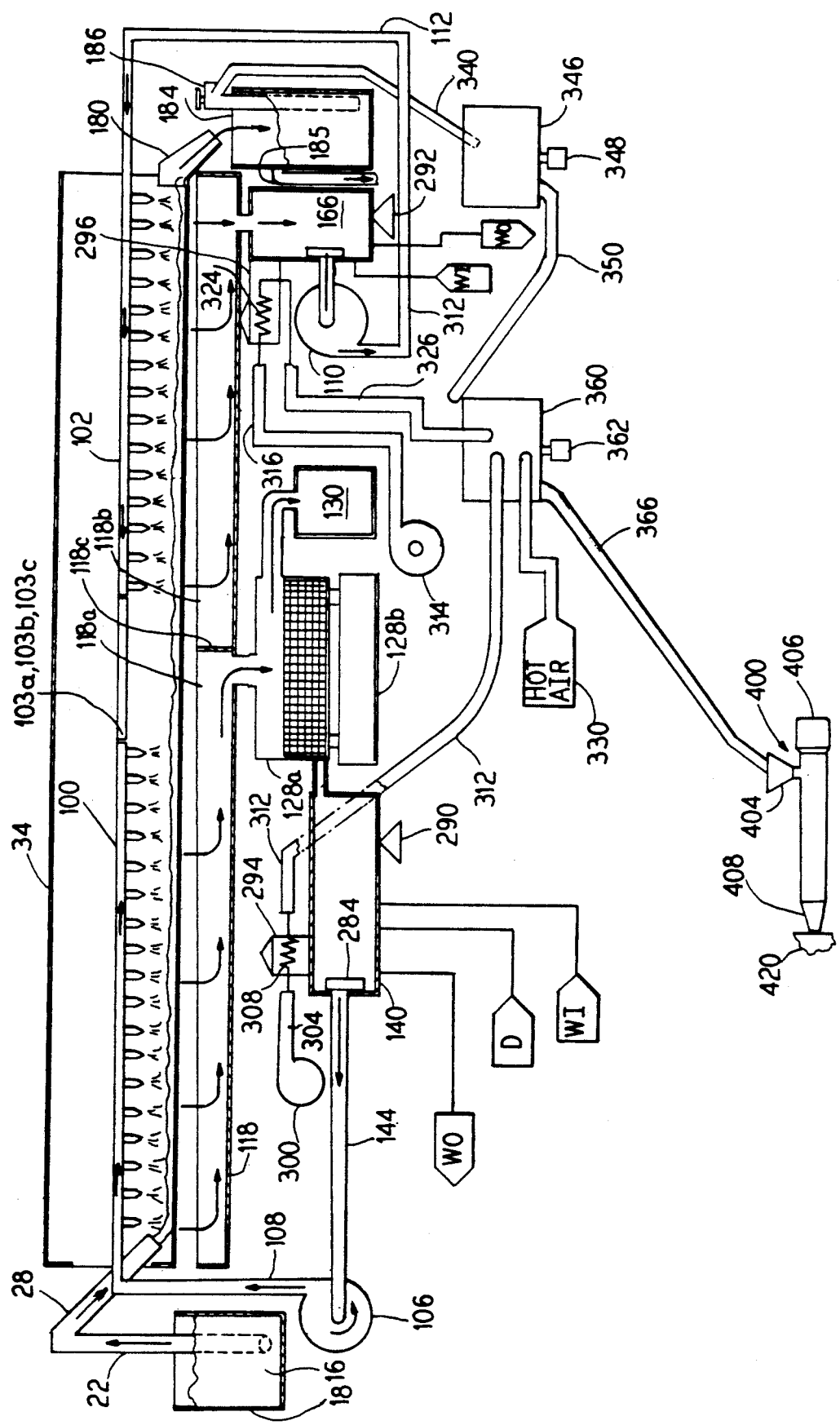
FIG. 6 is a process schematic of the washing process performed by the apparatus of FIG. 1.

FIG. 6 shows in schematic representation, the apparatus 10 wherein additional processing components are added. A filter means 282 is added at the rinse water tank to clean rinse water for recycling. Known means can be used to remove detergent from the rinse water. A second filter means 284 is added at the wash water tank 140 to remove dirt from the wash water. At both the wash water tank 140 and the rinse water tank 166 a water supply and a water outlet line WO can be provided. These lines can be used to maintain levels in the tanks 140, 166 or to freshen the water residing in the tanks 140, 166 by bleeding in a constant flow of "fresh" water and bleeding out a constant flow of "used" water. A wash water heater shown schematically at 290 is added to the wash water tank 140 to provide heated water for washing. A similar rinse water heater shown schematically at 292 can be added to the rinse water tank 166 to provide heated water for rinsing. The heaters 290, 292 can be fired heater, such as natural gas fired heaters, or can be electric heaters or any appropriate known type of heater.

When fired heaters are used for the heaters 290, 292 the wash water tank 140 and the rinse water tank 166 are provided with a first flue gas outlet duct 294 and a second flue gas outlet duct 296 respectively. A hot air system is added as a feature to the system. A first forced air fan 300 blows ambient air through a duct 304 and through a first heating coil 308 located in a flue gas stream for heat transfer between the flue gas and the ambient air inside the coil 308. The ambient air exits the coil 308 as hot air, the hot air blows through a duct 312 to a rotary drive 360 as described below.

A second hot air system is added as a second feature to the system. A second forced air fan 314 blows ambient air through an inlet duct 316 into a second heating coil 324 located in the flue gas stream from the rinse water heater 292. The hot air inside the coil thereupon blows through an outlet duct 326 to the rotary drier 360. The hot air system from the wash water tank and the second hot air system from the rinse water tank can be used together or separately and other variations using a common hot air blower or an induced draft blower can be readily visualized and are encompassed by the present invention. Also, the heating coils 308, 324 can be located at alternate locations with respect to the heaters 290, 292 rather than in the flue gas stream. It can be visualized that the heating coils 308, 324 are located in a radiant section or a convection section of the heater depending on the configuration of the heater. Such arrangements are also encompassed by the present invention.

The hot air systems at the heaters 290, 292 described above are used to supplement an outside source of hot air 330 for the rotary drier 360.

Washed fragments 16 are transported by the second auger 186 via a delivery duct 340 to a spin drier 346 driven by a first rotary mover 348. The fragment 16 are thereupon moved through an intermediate duct 350 to the rotary drier 360 driven by a second rotary mover 362 and fed hot air from the ducts 312, 326 from the heating coils 308, 324 respectively. The dried fragments exit the rotary drier 360 through a discharge conduit 366 to a next step in the recycling process.

As FIG. 6 shows this next step to the drying arrangement can be an extrusion process wherein the discharge conduit 366 feeds an extruder 400 through a funnel opening 404. A third rotary mover 406 turns an auger or screw located inside the extruder (not shown) which pushes the plastic fragment 16 through a reduction section 408. Heat is added to the extrusion process (not shown). The extruded plastic fragments 16 leave the reduction section 408 and are inserted into a next stage of the operation, which can entail a mold 420.

Although the present invention has been described with reference to a specific embodiment, those of skill in the art will recognize that changes may be made thereto without departing from the scope and spirit of the invention as set forth in the appended claims.

We claim as our invention:

1. The method for cleaning and preparing plastic fragments, the fragments created from plastic material having paper adhered thereto for recycling which includes the steps of:
   1. fragmenting plastic material of different types with uniformly sized particles sized in the range of ⅜ inch (95 mm) to ½ inch (127 mm),
   2. driving a supply of said particles in the form of a continuous circumferentially confined longitudinally extending stream,
   3. at one point in the stream directing a flow of washing liquid against the particles to wash paper from the plastic particles,
   4. at a second point in the stream downstream of said first point directing a flow of liquid rinse water against the particles to rinse the particles,
   5. at a third point in the stream downstream of the second point drying some washed and rinsed particles for use at a recycling site.

2. The method of claim 1 and further characterized by:
   step 3 comprising pressurizing a supply of washing liquid,
   directing the pressurized washing liquid to said one point in the stream,
   atomizing the pressurized washing liquid,
   admixing the particles and the atomized washing liquid at said one point in the stream,
   recovering paper removed from the particles and spent washing liquid,
   separating the paper from the spent washing liquid, and returning the spent washing liquid for recycling.

3. The method of claim 2 and the added step of selectively heating the washing liquid to enhance its washability.

4. The method of claim 1 and further characterized by:
   step 4 comprising pressurizing a supply of rinsing liquid, directing the pressurized rinsing liquid to said second point in the stream, atomizing the pressurized rinsing liquid, admixing the washed particles and the atomized rinsing liquid at said second point in the stream, and returning the rinse liquid for recycling.

5. The method of claim 1 and the added steps of separately collecting and recycling the washing and rinsing liquids.

6. The method of claim 5 and the added steps of separating paper from the washing and rinsing liquid, and collecting the paper.

7. The method according to claim 1 comprising the further step of between said second point and said third point collecting the particles in a volume of water and separating the particles which float from the particles which sink.

8. The method according to claim 1 comprising the further step of collecting paper washed from the plastic particles and continuously screening said paper and residue from said wash water and continuously transporting said paper and residue away from the screening operation.

9. A method of cleaning and preparing plastic fragments for recycling, the plastic fragments created from plastic material which has paper adhered thereto, which includes the steps of:

fragmenting the plastic material into particles;

driving a supply of said particles in the form of a continuous circumferentially confined longitudinally extending stream;

at one location in the stream directing a flow of washing liquid against the particles to wash the paper from the plastic particles;

at a second location in the stream downstream of said first location directing a flow of liquid rinse water against the particles.

10. The method according to claim 9, wherein the circumferentially confined longitudinally extending stream is declined in a direction along the progression of said stream.

11. The method according to claim 9 comprising the further step of, at a third location in the stream, downstream, of the second location, drying the washed and rinsed particles.

12. The method according to claim 9 comprising the further step of at a third point in the stream, downstream of the second location, collecting the washed and rinsed particles in a volume of water and separating those particles in a volume of water and separating those particles which float from those particles which sink.

* * * * *

UNITED STATES PATENT AND TRADEMARK OFFICE
CERTIFICATE OF CORRECTION

PATENT NO. : 5,180,437
DATED : January 19, 1993
INVENTOR(S) : Robert M. Anderson et al It is certified that error appears in the above-indentified patent and that said Letters Patent is hereby corrected as shown below:

In claim 12, column 10, lines 25-26, please delete second occurrence " in a volume of water and separating those particles".

Signed and Sealed this

First Day of March, 1994

*Attest:*

BRUCE LEHMAN

*Attesting Officer*     *Commissioner of Patents and Trademarks*